May 2, 1939.  E. SIEGLING  2,157,061
DRIVING BELT
Filed Nov. 16, 1937    3 Sheets-Sheet 1

Inventor:
E. Siegling

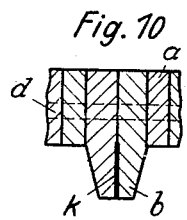
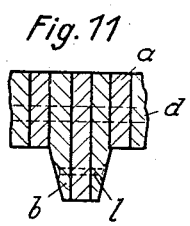
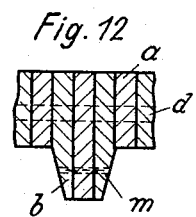
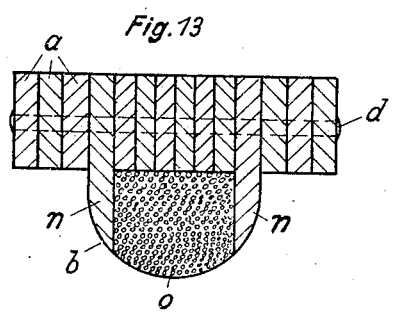
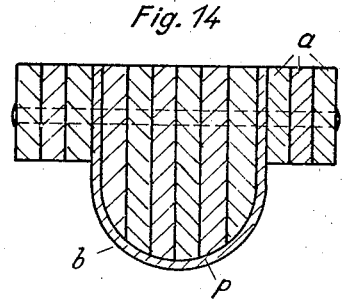
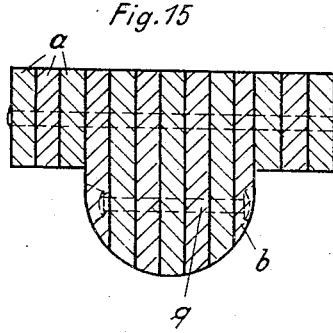
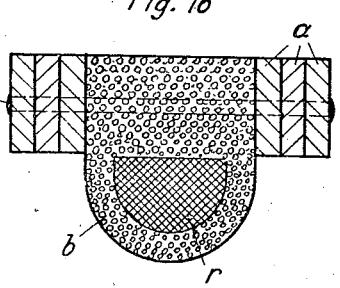

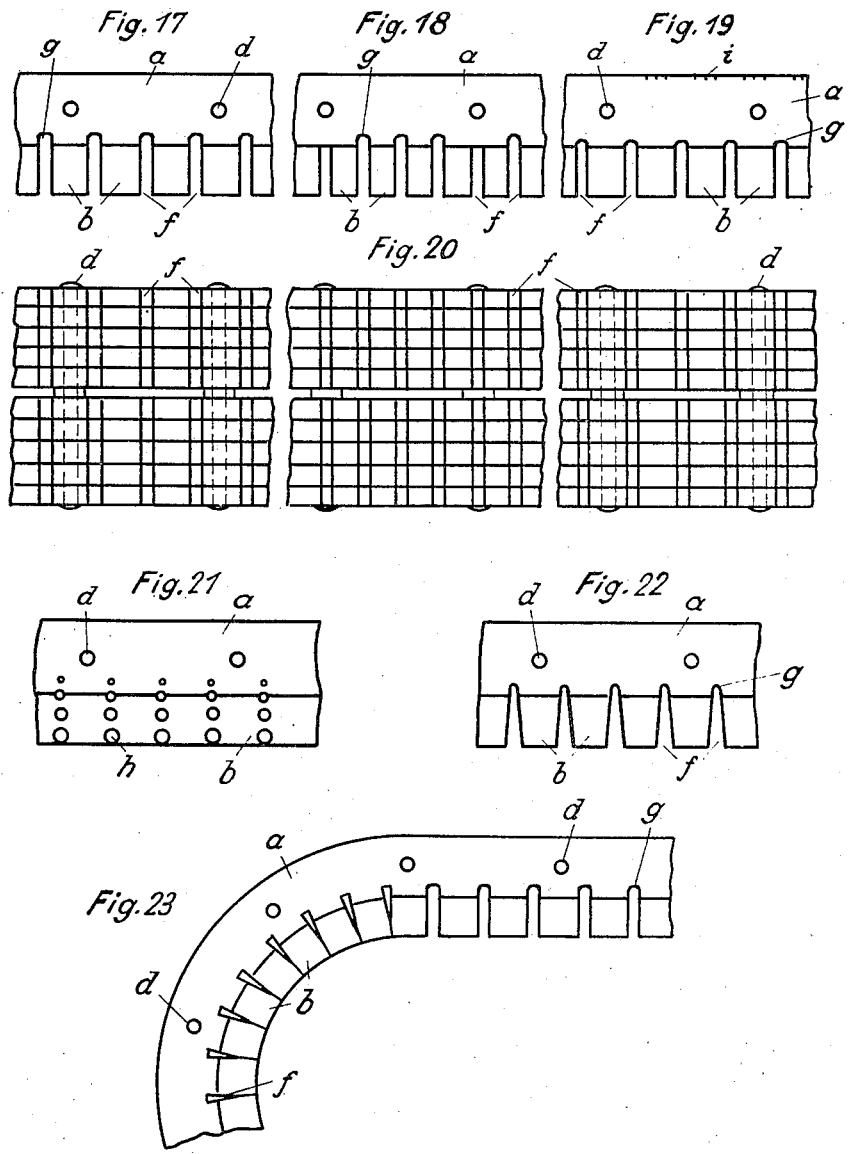

Patented May 2, 1939

2,157,061

UNITED STATES PATENT OFFICE 2,157,061

DRIVING BELT

Ernst Siegling, Hanover, Germany

Application November 16, 1937, Serial No. 174,843
In Germany April 30, 1937

2 Claims. (Cl. 74—232)

So called flat driving belts are known having an undivided cross-section provided with projecting wedge-shaped ribs on the running side, and of which the flat portion as well as the wedge-shaped portion participate in the transfer of force.

The present invention is however exclusively concerned with driving belts constituted by leather strips set on edge and connected together to form a flat belt. According to the present invention the new feature consists in that some of the leather strips are higher than the remaining greater portion of the strips which are of equal height, and that these portions projecting beyond the lower edge of the running side of the belt are arranged to run in grooves of a pulley.

These higher portions may according to one constructional form of the present invention be made of rectangular cross-section and running with play in the grooves of the pulleys in which case they do not transfer force.

According to another aspect of the invention, the projecting strips may be made of wedge-shaped cross-section so that in a manner known in itself they transmit force as well as the upper portion of the belt.

Further according to the invention the strips engaging or simply projecting into the grooves of the pulleys may be constituted in crosswise direction, of a number of individual parallel strips. Further it is possible to make the projecting portions and the belt itself each of a different material in accordance with the required action.

On the drawings a number of constructional forms of the new strip-on-edge belt are illustrated, the Figures 1 to 16 showing cross-sections of various forms of strip-on-edge belts comprising parts projecting therefrom. Figures 17 to 19 and 21 to 23 show respectively side elevations of various such strip-on-edge belts, Figure 20 being a plan view.

In all the illustrations the strips set on edge constituting the belt, are designated with $a$, $d$ are the rivets or the like by means of which the strips $a$ are held together in a known manner.

From the cross-sectional illustrations of Figures 1 to 16 it will be seen that members forming unilateral or bilateral projections $b$ are inserted in the strip-on-edge belt $a$, these members serving to engage into grooves of a cooperating pulley $c$.

Figure 1:
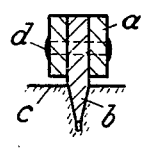

For example Figure 1 shows a strip-on-edge belt formed of two leather strips $a$ between which a strip $b$ consisting of leather for example, is inserted which engages in the form of a wedge into the wedged groove of the pulley $c$.

Figure 2:
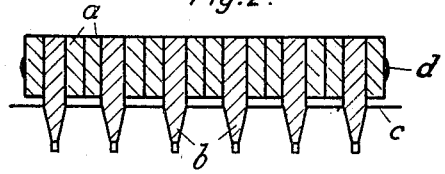

Figure 2 shows a multiple arrangement of such wedge-shaped projections $b$ engaging into the groove of the pulley, the connections between the strips being assured by means of the rivets $d$.

Figure 3:
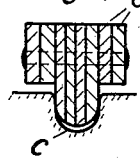

In the constructional example according to Figure 3 the member $b$ inserted between the leather strips $a$ of the strip-on-edge belt is formed of a number of layers of leather or other suitable material kept together with the strip-on-edge belt $a$ by means of rivets $d$.

The projection $b$ is here of a rounded shape, in accordance with the groove provided in the pulley $c$.

Figure 4:
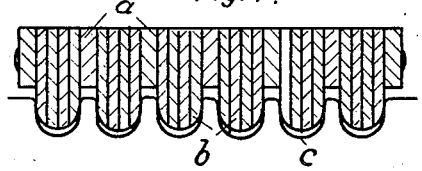

Figure 4 shows a multiple arrangement of projections according to Figure 3.

Figure 5:
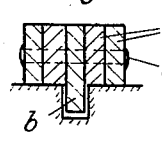
Figure 6:
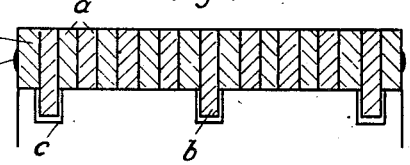

The Figures 5 and 6 show in single and multiple arrangement respectively projections $b$ of an angular cross-section which in this case only act as guiding members, the strip-on-edge belt lying in contact with the pulley $c$, in contradistinction to the constructional forms of Figures 1 to 4, so as to act as a friction member. In this constructional form the longitudinal grooves in the rim of the pulley are wider than the guiding ribs of the transmission means.

The transmission of power is effected through adhesive friction of the running surface of the strip-on-edge belt, and as shown in Figure 6, when the guiding is effected in such an exact manner by the ribs $b$, it is possible for the width of the pulley to be utilised completely or nearly completely.

Figure 7:
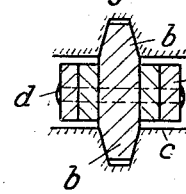
Figure 8:
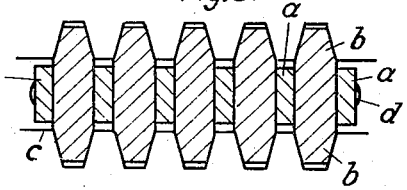

Figures 7 and 8 show in cross-section strip-on-edge belt $a$ having bilateral wedge-shaped projections $b$ engaging into wedge grooves of the pulley $c$. A strip-on-edge belt of this type is suitable for reversing drives.

Figure 9A:
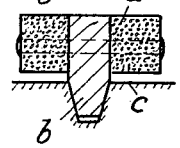
Figure 9:
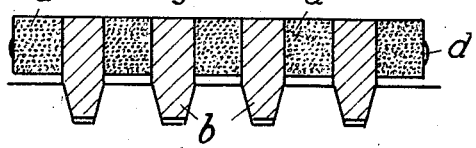

In Figures 9 and 9a further constructional forms are shown for illustrating the fact that the individual strips of the strip-on-edge belt $a$ may be made also from a material other than leather. For example interwoven square ropes or layers of fabric interconnected by means of caoutchouc, gutta-percha or the like may be employed. The strip-on-edge belt acts as a tractive member in the same manner as in the constructional forms of Figures 1 to 4 and 7 and 8, the frictional members being constituted by the projections $b$.

In the constructional forms according to Figures 10, 11 and 12 the wedge-shaped frictional member $b$ inserted in the strip-on-edge belt $a$ and projecting from it is constituted by a number of layers which are held together within the range of the strip-on-edge belt by the rivets $d$. The wedge-shaped projection may be specially held together by means of adhesive $k$ according to Figure 10, by riveting 1 according to Figure 11 or by a rivet $m$, e. g. from vulcan fibre according to Figure 12.

In the constructional form according to Figure 13 the projection $b$ is formed by two side or jaw straps $n$ enclosing a central filler $o$ of a suitable material. This filler $o$ may be constituted by natural or artificial caoutchouc or other suitable and more or less resilient artificial material.

Figure 14 shows in cross-section a further constructional example in which the projection $b$ is constituted by a number of layers having a coat of leather or fabric securing the connection of the said layers.

The projection $b$ according to Figure 15 shows likewise a number of layers which are held together by a countersunk rivet $q$. The layers may alternately be made of different material. For example, layers of leather may alternate with layers made of fabric and caoutchouc or the like.

The constructional form according to Figure 16 shows inserted in the strip-on-edge belt $a$ a uniform body forming a projection $b$ and constituted for example of fabric and caoutchouc or a material similar to caoutchouc. Within the projection $b$ a core $r$ of a suitable material may however, be embedded which is adapted to increase the resistance to tear or the resilient qualities of the projection $b$.

Figures 17 to 19 show side elevations of the strip-on-edge belt from which it may be seen that the projections $b$ are made with incisions $f$ all of which according to Figures 17 and 19, or some of which (Figure 18) extend into the strip-on-edge belt $a$.

The plan view (from below) represented in Figure 20 illustrates the longitudinal shape of these incisions.

From Figure 23 it may be seen that the individual projections $b$ support on one another when the belt runs through a curved path.

Figure 21 shows the incisions replaced by crosswise extending holes $h$ which, as is shown in Figure 22, may be replaced by slots decreasing in clear width. The incisions $f$ or the holes $h$ may be all located in the projections only.

If, for the incisions $g$ or the holes $h$ as far as they go through the strip-on-edge belt $a$, a cross-section is selected which does not exceed the cross-section of the rivet $d$ holding the strip-on-edge belt together, and the incisions $g$ or the holes $h$ are arranged in staggered relation with respect to the rivet holes, the cross-section of the strip-on-edge belt is at no place weakened more than it is anyhow by the hole for the rivet shaft, so that in practice no weakening of the cross-section is effected by the provision of the incisions or holes.

It is further possible, as shown in Figure 19, to provide incisions $i$ at the outer surface of the strip-on-edge belt. In all cases the incision or notch should only penetrate to such an extent that no greater weakening is effected of the straps of the strip-on-edge belt than that already caused by the holes for receiving the cross-connecting means.

Although a number of constructional forms of the invention has been described hereinbefore, it should be understood that the invention is not restricted to the constructional forms shown the features of which may be combined in various different manners within the scope of the present invention.

Having now described my invention, what I claim as new and desire to secure by Letters Patent is:

1. A belt drive for use with two pulleys arranged at a distance from one another and each provided at its circumference with at least one wedge-shaped annular groove, said driving belt adapted to co-operate with said pulleys and being composed of strips set on edge side by side and connected together, the greater portion of the number of these strips being equal in height and at least one strip having greater height than the remaining strips and having wedge-shaped cross-section in its projecting portion, the driving belt being so arranged that the higher strip is adapted to engage into the annular groove of the pulley.

2. A belt drive for use with two pulleys arranged at a distance from one another and each provided at its circumference with at least one wedge-shaped annular groove, said driving belt being adapted to co-operate with said pulleys and being composed of strips set on edge side by side connected together, the greater portion of the number of these strips being equal in height and at least one strip having greater height than remaining strips and having wedge-shaped cross-section in its projecting portion and being subdivided by incisions extending throughout the height of the projecting portion, and which are of small dimension in the longitudinal direction of the belt, whereby when the belt runs over a pulley the adjacent surfaces of the higher strip contact one another; said driving belt being arranged that the higher strip is adapted to engage into the annular groove of the pulleys.

ERNST SIEGLING.